Sept. 9, 1958 H. T. LIBBY 2,851,581
ARC WELDING METHOD AND APPARATUS
Filed April 6, 1954
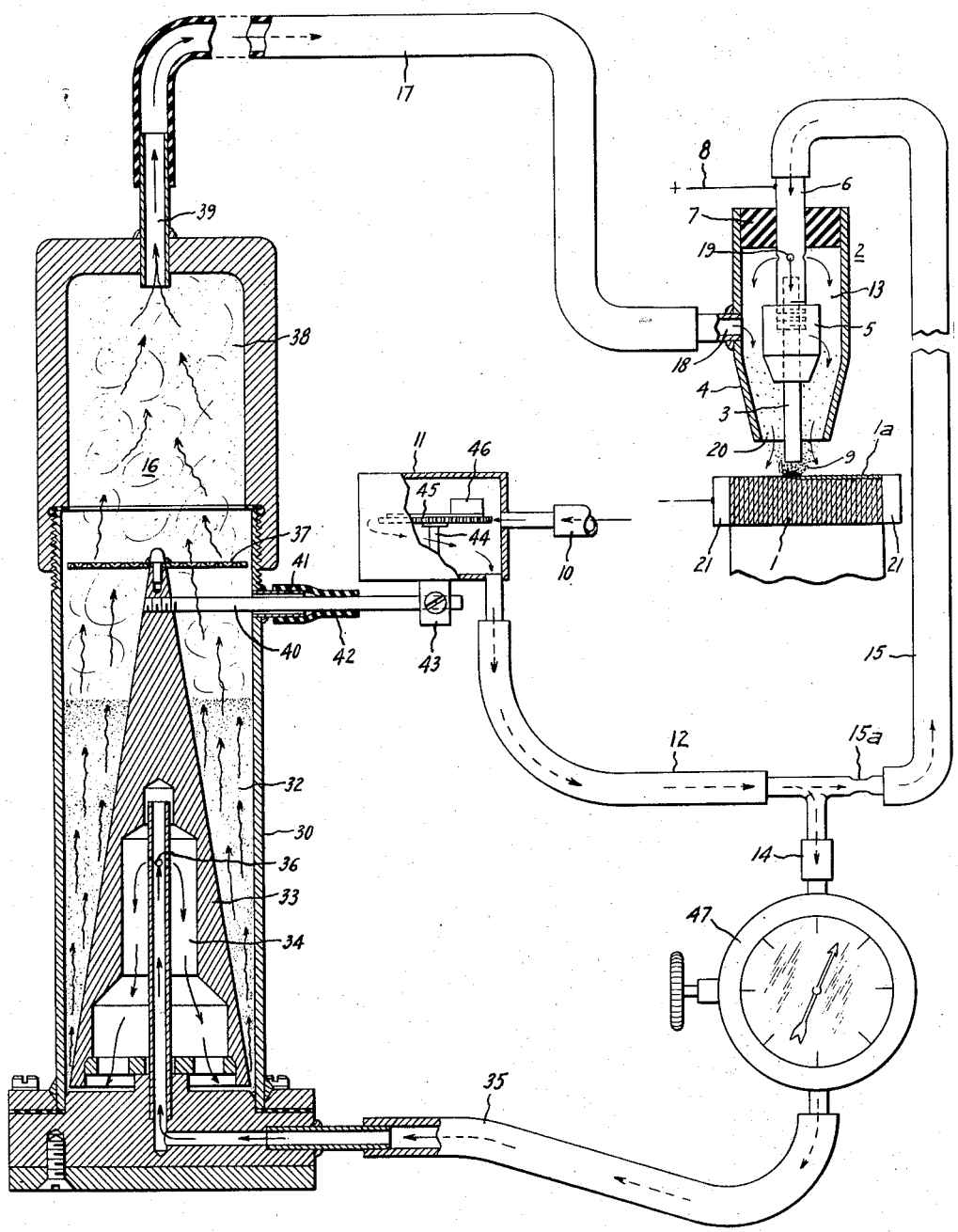
Inventor:
Henry T. Libby,
by [signature]
His Attorney.

United States Patent Office 2,851,581
Patented Sept. 9, 1958

2,851,581

ARC WELDING METHOD AND APPARATUS

Henry T. Libby, Reading, Mass., assignor to General Electric Company, a corporation of New York Application April 6, 1954, Serial No. 421,267

9 Claims. (Cl. 219—74)

This invention relates to a method of arc welding metals and apparatus particularly adapted for use therefor.

In the process of welding metals by fusion wherein an electrode is connected to one pole of the source of the current, and the work to the other pole, it is sometimes found that the weld is not as satisfactory as it should be. For instance, in the case of the edge welding of laminated magnetic core structures of low carbon steel, the weld may exhibit high porosity and low ductility in the absence of providing a groove for the weld bead. Since a groove has an adverse effect on the magnetic properties of a core, it is obviously desirable that the welding be done without the use of a groove and weld bead buildup. The problem of porosity and low ductility of the weld is increased in magnetic laminated core structures because it is desirable that the laminates have a surface treatment such as iron phosphate to reduce the eddy current losses of the core. Additionally, the presence of oil or rust or other foreign matter on the surface to be welded prevents the formation of a satisfactory weld. My investigation indicates that weld porosity is due to arc instability which results from the propensity of the arc to seek the path of least resistance between the electrode and the work piece. If there is slag, oil, oxide, or other foreign matter on the area where the fusion is to be done, the arc does not heat that area uniformly with the remaining portions of the metal along the weld path. While the use of a de-oxidant such as aluminum coated on the work surface assists in overcoming this difficulty, the use of a de-oxidant alone does not produce arc stability, and accordingly it is an object of this invention to provide a method of and apparatus for stabilizing the arc in an arc welding process.

It is another object of this invention to provide a method of an apparatus for confining the point of contact between the arc and the work piece to a small closely controlled area.

A further object of this invention is to provide an improved method of and apparatus for welding low-carbon laminates without prior weld surface or the use of grooves.

A still further object of this invention is to provide simple, positive and flexible means for entraining finely divided metallic particles uniformly in a gas stream.

Further objects and advantages of this invention will become apparent and this invention will be better understood from the following description referring to the accompanying drawing, and the features of novelty which characterize this invention will be pointed out with particularity in the claims annexed to and forming part of this specification.

The drawing is a side elevational view, partly broken away and in section, illustrating one form of arc welding apparatus embodying this invention.

In accordance with the illustrated embodiment of this invention, means are provided for joining the edges of a plurality of laminations by an inert arc welding process. An inert gas, such as helium under pressure, passes through a turbine motor to operate the same and then flows by two parallel paths to a welding head. The flow through one of the parallel paths passes through a dispenser containing finely divided metallic powder, such as aluminum, which is entrained in the gas and uniformly mixed in the welding head with the gas from the other parallel path. The aluminum powder is carried by the gas from the welding head and is directed toward a small area of the surface being welded guiding the arc to the same small area by providing a path of low resistance irrespective of the impurities on the surface of the laminations to uniformly heat the edges of the laminations at all points along the weld path as the welding head traverses the laminations. A vibrator within the dispenser operated by the turbine motor prevents tunnels from being formed in the powder so that the metal entrained in the gas is kept uniform at all times.

Apparatus for carrying my invention into practice is shown in the drawing in which a laminated structure 1, such as a magnetic core for a dynamoelectric machine held between clamping jaws 21, is to be joined into a unitary structure by the fusion of the edges of the lamination to form a weld. An arc welding head 2 is provided and comprises a welding electrode 3, shown here as being of the non-consumable type, formed of a metal such as tungsten and a torch nozzle 4 surrounding the electrode 3. Electrode 3 is secured in a metallic chuck 5 to an inlet tube 6. Nozzle 4 is secured to tube 6 by an insulating bushing 7. A source of D. C. power 8 is connected to inlet tube 6 for transmitting current to electrode 3. The other side of the power source 8 is connected to the laminations 1 so that an arc will be formed between electrode 3 and the edge of the laminations 1 as the electrode 3 is steadily advanced along the edge of the laminations to melt and fuse the same, as at 1a, in the usual manner.

To shield the arc and the molten weld pool formed on the surface of the laminations from oxidation, a continuous stream of non-oxidizing gas, such as helium, flows from nozzle 4 to form a protective shield 9 which surrounds the arc and the weld pool. The tip of nozzle 4 is shaped to concentrate the protective shield 9 on a small area on the edges of the laminations.

In the drawing, a source of gas (not shown) under pressure is attached to tube 10 wherein it passes through a turbine 11 and through pipe 12 to the chamber 13 formed by nozzle 4 of the welding head 2 through two branch pipes 14 and 15. As illustrated, branch pipe 14 passes through a container means 16 which constitutes a powder dispenser for uniformly dispensing a small amount of finely divided powder, such as aluminum, into the gas stream passing therethrough before entering chamber 13 through tube 17. The uniformly laden gas entering chamber 13 from tube 17 through adapter 18 is intermixed with the non-laden gas entering chamber 13 through apertures 19 of inlet tube 6. The finely divided particles are then carried by the combined gas streams from tubes 15 and 17 through the end 20 of the nozzle 4 to form a protective shroud 9 surrounding the electrode and weld pool. It is believed that the kinetic energy and momentum of the metallic particles cause them to be carried by the gas stream so that they directly impinge the surface of the laminations closely adjacent the weld pool to provide an arc path of low resistance which will funnel the arc to a small area so that the point of contact of the arc is narrowly limited to a closely defined area to provide a uniform depth of heat penetration along the weld path to produce a fused section 1a of uniform depth, smooth surface, low porosity and high ductility. Additionally, by insuring uniform heating of the laminations along the weld path, minimum distortion of the laminations due to unequal depth and intensity of heating from point to point is effected. It is believed that without some means of stabilizing the arc, the arc has a tendency to wander or to contact the surface over a widely dispersed area to heat the material to be fused non-uniformly, especially if the electrical resistance of the metal to be fused varies as by surface contamination. In any event, while the deoxidizing effects of the aluminum or other similar powders are well known, the utilization of a finely divided metallic powder entrained in a protective gas shield flowing around the welding electrode to stabilize the arc produces improved welds and is believed to be novel.

It is apparent that other materials could be used in place of aluminum, or alternatively, that other materials, such, for example, as ferro-manganese, could be mixed with the powdered aluminum to combine with particular impurities, such as sulphur, in the metal being welded to increase the strength and toughness of the weld and to reduce porosity of the weld bead.

The utilization of a gas-carrying powder forming a shield surrounding the arc has resulted in the satisfactory edge welding of laminations having a film of oil or foreign matter on their surfaces without prior cleaning. In addition, silicon iron laminations and laminations initially provided with an iron phosphate surface treatment have been satisfactorily welded by the improved method of this invention with the resulting weld having a smooth surface appearance, low porosity, high ductility and uniform depth of penetration.

Tests indicate that arc stability is responsible for the improvement in the welds rather than any reducing action of the aluminum or other material being used. For example, welds of the highest ductility and lowest porosity are consistently made by using a given small amount of powder. The use of a greater amount of powder produces less ductile welds whereas the reducing action is greater. In the edge welding of low carbon steel laminations utilizing only aluminum powder, for example, it has been found that a mixture of approximately 4.65 grams of 94%–325 mesh powder uniformly entrained in 10 cu. ft. of helium consistently produced welds of higher ductility and lower porosity than greater or less dense concentrations of powder.

To uniformly entrain finely divided powder in a gas stream, a dispenser 16 constructed according to my invention comprises a lower portion for a body of comminuted material, such as aluminum powder, adjacent the bottom of the dispenser adapted to act as a dispensing zone, means such as ports for admitting gas into the chamber, a discharge conduit adjacent the top of the chamber, a cloud chamber located adjacent the discharge conduit, and means for insuring that the gas passing through the chamber will pick up or entrain a uniform quantity of powder and carry it to the discharge conduit. For simplicity the term "powder" is employed in this description and in the claims to denote finely divided material of any degree of fineness which may be dispensed by apparatus embodying the principle of my invention.

More particularly, the preferred form of powder dispenser comprises a vertically arranged cylindrical chamber 30 having a body of powder 32 therein. Within the chamber is a centrally located, cone-shaped vibrator means 33 which is hollow at its lower end to provide a chamber 34 for the unimpeded entry of gas into the dispenser through pipe 35 and ports 36. A strainer 37 is shown as being secured to the upper end of vibrator means 33 for the purpose of breaking up into individual particles any particles which are lumped together and are not uniformly distributed in the gas. The dispenser 16 provides a cloud or blending chamber 38 above strainer 37 in which the swirling motion of the gas therein further serves to uniformly entrain the powder in the gas as it emerges from the container at outlet port 39.

Vibrator 33 is supported by rod 40 which is journaled in sleeve 41 for vibratory motion. A boot 42 formed of a resilient material serves to seal rod 40 with respect to sleeve 41 to prevent powder from passing therebetween. The outer end of rod 40 is connected by means of lever 43 on which shaft 44 of turbine wheel 45 is rotatably mounted. A weight 46 eccentrically located on turbine wheel 45 produces an unbalance which, upon rotation of the turbine wheel, causes shaft 44 to vibrate.

In operation, non-oxidizing gas passes through tube 10 into turbine 11 to vibrate cone 33 to prevent the formation of vertical tunnels in powder 32 which would vary the amount of powder picked up by the air bubbling therethrough. It will be observed that the energization of turbine 11 is proportional to the amount of gas flowing through dispenser 16 so that the vibration of cone 33 is proportional to the rate of use of the powder. After the gas energizes turbine 11, it passes through tubes 12 and 15 to the nozzle 4 and through tube 14 into an adjustable valve 47 which may be utilized to vary the percentage of the total gas passing through the dispenser. An orifice 15a insures that the gas will flow through the more arduous path through dispenser 16. Thus any desired portion of the gas may pass through the dispenser 16 so that wide variations in the density of the mixture of the gas and powder emerging from nozzle 4 can be obtained.

After passing through valve 47, the gas enters dispenser 30 through ports 36 and bubbles up through the body of powder 32 where it entrains particles of powder proportional to the quantity and velocity of gas passing therethrough. Upon emerging from the body of powder 32, the gas passes through strainer 37 to break up any lumps of powder. It then enters blending chamber 38 where the swirling motion of the gas uniformly distributes the powder in the gas. Because of the fineness and the small amount of powder required, there is little tendency for the powder, once it is uniformly distributed in the gas to settle out during the passage of the gas through tube 17 into welding nozzle 4 where it operates to stabilize the arc as hereinbefore described.

From the foregoing it is apparent that this invention provides a method of arc welding wherein the arc is stabilized to produce uniform heating resulting in smooth welds of low porosity and high ductility through the use of apparatus providing a light, uniform mixture of conducting powder in a non-oxidizing gas shield surrounding the arc.

While there is shown and described particular embodiments of this invention, further modifications and improvements thereof will occur to those skilled in the art. It is to be understood, therefore, that this invention is not limited to the particular forms shown, and it is intended in the appended claims to cover all modifications which do not depart from the spirit and scope of this invention.

What I claim as new and desire to secure by Letters Patent of the United States is:

1. In arc welding, apparatus for use in uniformly distributing powder in a gas stream comprising a container having a chamber for holding a body of said powder and an outlet spaced above the free level of the powder for the discharge from a fog space above said free level of the gas having powder suspended therein, inlet means for carrying compressed gas through the body of said powder supply connected to said container to pass streams of gas bubbles through said powder body to carry particles of powder into said fog space, a central cone-shaped element submerged in the body of powder, and means operated by said gas stream to vibrate said central element to prevent the formation of tunnels in the body of powder.

2. A dispenser for use in uniformly distributing finely divided powder in a gas comprising a chamber for holding a body of powder, inlet means for passing the gas through the body of powder, outlet means spaced from the free level of the powder for the discharge of gas having powder entrained therein from a blending space therebetween, means for agitating the body of powder and means for actuating said agitating means in proportion to the rate of use of the powder.

3. A dispenser for use in uniformly distributing finely divided powder in a gas comprising a container for holding a body of the powder and providing a cloud space for uniformly diffusing the powder in said gas prior to discharge therefrom, inlet means for said container connected to bubble the gas through said powder to thereby carry particles of said powder into said cloud chamber, vibrator means submerged in the powder, and means for operating said vibrating means proportionally to the rate of use of the powder.

4. A method for improving the stability of an arc utilized in an arc welding process comprising the steps of dividing an inert gas stream into a pair of parallel paths, entraining metallic particles in the gas in the first of said paths to form a mixture, blending said mixture with the unladen inert gas from the other of said paths to impart a velocity to the metallic particles greater than that provided by the gas in the first path, and delivering the resultant combined stream past an electrode and against a workpiece to form a protective shroud around the electrode and for providing an arc path of low resistance effective in funneling the arc made by said electrode with said workpiece to a small closely defined area for limiting the point of arc contact and for providing uniform depth of heating penetration in said workpiece.

5. The method according to claim 4 further including the step of controlling the amount of gas in the said first path for varying the density in the mixture of inert gas and metallic particles.

6. Arc welding apparatus for providing arc stability and deoxidation of a molten pool of weld metal during a welding cycle comprising a welding electrode adapted for positioning adjacent a plurality of assembled parts to be welded, a nozzle having a pair of inlets and a converging outlet, means positioning said nozzle in concentric relationship with said electrode, mixing means for uniformly entraining metallic particles in an inert gas connected with one of said inlets, a chamber in said nozzle having communication with both said inlets wherein the particle-laden inert gas and a non-laden inert gas delivered through the other inlet are commingled and a velocity imparted to the particles by the non-laden inert gas in excess of that provided by the laden gas prior to ejection through said outlet to said assembled parts, said commingled inert gases being effective in providing a path of low resistance for said arc between said electrode and said parts and in providing a non-oxidizing gas shield around said arc for funneling the latter between said electrode and a precisely controlled point on said parts irrespective of magnetic disturbances or surface impurities tending to cause arc instability.

7. In arc welding the method of stabilizing an arc during a welding process comprising the steps of entraining metallic powder in an inert gas in an amount proportional to the flow of the gas to form a mixture, delivering the mixture in a continuous stream past a non-consumable electrode to provide a non-oxidizing shield capable of surrounding an arc made by said electrode with a workpiece and for forming a path of low resistance therebetween, projecting said mixture against said workpiece in a concentrated pattern to encompass a molten metal pool made by the welding operation and to funnel the arc to a precise location on the workpiece.

8. Arc welding apparatus comprising an electrode, a nozzle enclosing but spaced from said electrode a distance sufficient to permit flow of gas therebetween and toward a workpiece, means connecting a source of gas supply to said nozzle, and means uniformly and selectively feeding small quantities of metal powder into a gas stream supplied to the nozzle for providing a non-oxidizing gas shield around said electrode which funnels the electrode arc to a precise location on the workpiece, said feeding means comprising a receptacle for holding a supply of said powder, said receptacle having an inlet connected to pass the gas through said powder to entrain the same in controlled amounts, a blending chamber for receiving the gas having powder suspended therein to uniformly diffuse said particles throughout said gas, and means for agitating said supply of powder in proportion to the rate of flow of gas around the electrode.

9. Arc welding apparatus for welding the edges of laminates comprising a non-consumable welding electrode disposed adjacent the edge of the laminates and adapted for movement steadily across said laminates along a weld path, nozzle means surrounding said electrode, means for supplying a continuous stream of non-oxidizing gas to said nozzle, said last-named means including a powder dispenser positioned in the gas stream for uniformly entraining a metallic powder in said gas in varying amounts depending on the velocity of the stream through the dispenser, said nozzle means being shaped to concentrate the stream of powder laden gas on a small area of said laminates for stabilizing the arc between said electrode and said laminates to confine the arc to a precisely controlled point thereon.

References Cited in the file of this patent

UNITED STATES PATENTS

| 1,108,592 | Lincoln | Aug. 25, 1914 |
| 1,144,390 | Strohmenger | June 29, 1915 |
| 1,161,366 | Wohlrad | Nov. 23, 1915 |
| 1,294,250 | Elliott | Feb. 11, 1919 |
| 1,501,266 | Brace | July 15, 1924 |
| 2,003,167 | Alexander | May 28, 1935 |
| 2,083,309 | Applegate | June 8, 1937 |
| 2,123,537 | Marr | July 12, 1938 |
| 2,151,914 | Hopkins | Mar. 28, 1939 |
| 2,164,483 | Watson | July 4, 1939 |
| 2,327,337 | Burch et al. | Aug. 24, 1943 |
| 2,448,785 | Dolan | Oct. 7, 1948 |
| 2,549,033 | Tyrner | Apr. 17, 1951 |
| 2,694,763 | Muller | Nov. 16, 1954 |
| 2,694,764 | Muller | Nov. 16, 1954 |

FOREIGN PATENTS

| 82,917 | Switzerland | Nov. 1, 1919 |
| 143,331 | Great Britain | May 27, 1920 |